April 3, 1956
T. CONONELOS
2,740,637
HOIST HAND TRUCK
Filed Dec. 15, 1951
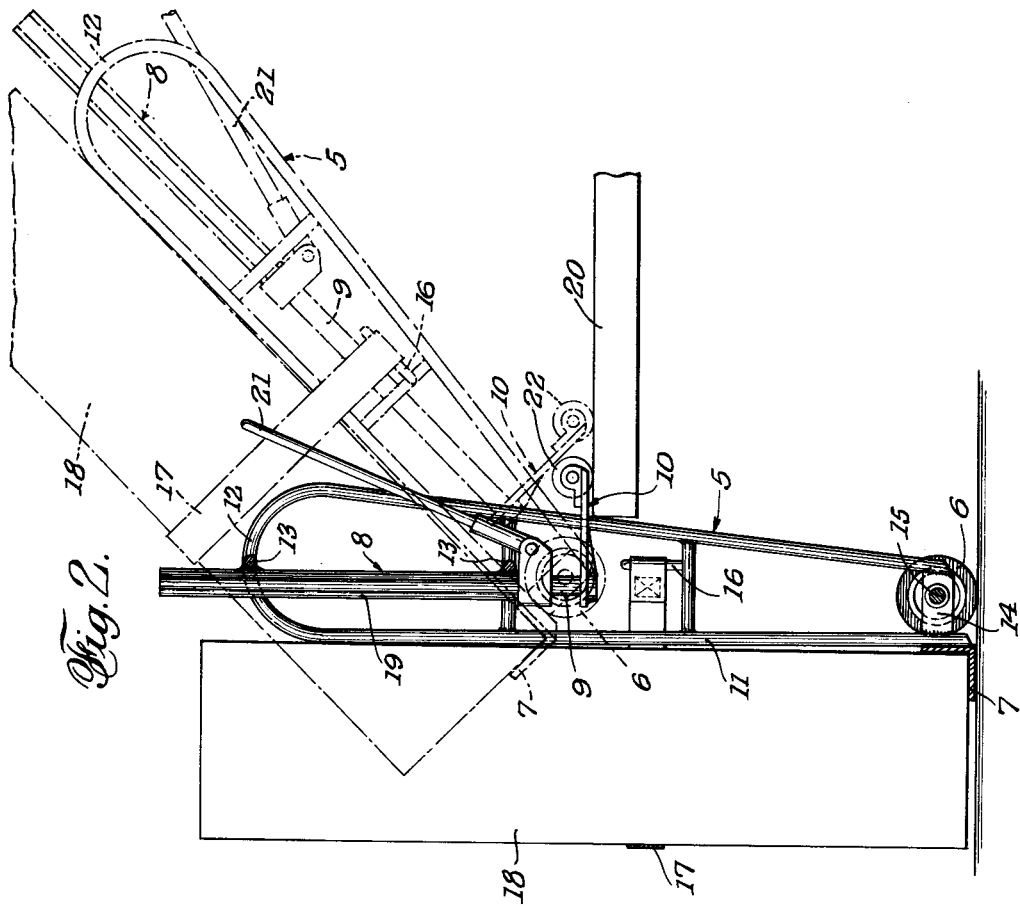
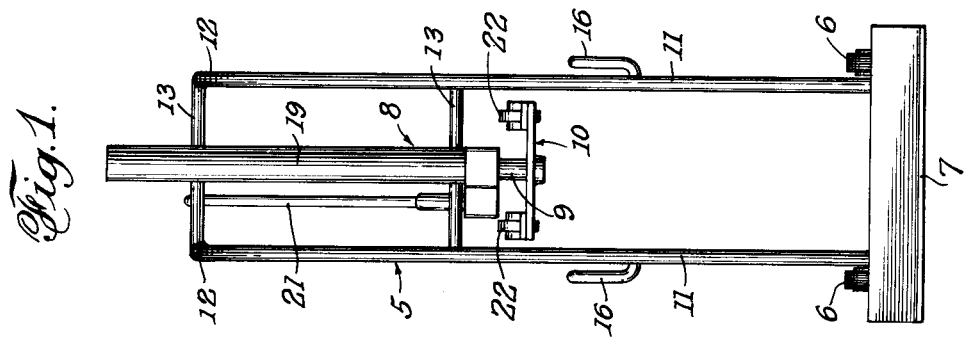
Inventor
TERRY CONONELOS
By C. G. Stratton
Attorney ns that may
United States Patent Office 2,740,637
Patented Apr. 3, 1956

2,740,637

HOIST HAND TRUCK

Terry Cononelos, McGill, Nev.

Application December 15, 1951, Serial No. 261,770

2 Claims. (Cl. 280—5.3)

This invention relates to a hand truck and it is the primary object of the invention to provide a hand truck that embodies a hoist for elevating the load on the truck.

A conventional hand truck can bring a load to the tail of a vehicle. Unless said vehicle is provided with an expensive tail-gate elevator or the like, transfer of the load from the hand truck to the vehicle can be accomplished only by manual lifting. For heavy articles and crates, such manual lifting frequently requires the services of two or more men and is, nevertheless, hazardous.

Another object of the invention is to provide a hand truck having vehicle tail-engaging means that constitutes a support relative to which the truck and load is elevatable to bring the same to the level of the vehicle tail for easy transport onto the vehicle.

Another object of the invention is to provide a hand truck as above, with jack means operable by a person on the vehicle to effect the mentioned elevation of the truck and load thereon.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a front elevational view of a hoist hand truck embodying features of the present invention.

Fig. 2 is a longitudinal sectional view thereof, showing the truck in operative association with the tail of a vehicle.

The hoist hand truck that is illustrated comprises, generally, a vertical frame 5 having traction wheels 6 and a load-supporting ledge 7 at the lower end thereof, and a jack 8 affixed to said frame and having a downwardly projecting ram 9 provided at its end with a rearwardly directed platform 10.

The truck frame 5, as shown, is formed of rod or tubular stock, although the same may be formed of variously-sectioned elements. The frame shown comprises side frame members 11 that are each provided with upper arcuate portions 12 that constitute handholds, transverse members 13 that connect the upper and intermediate portions of said side frame members 11, the ledge 7 connecting the lower portions thereof, bridge plates 14 at the lower edges of the side frame members and mounting the axle 15 of wheels 6, and anchor elements 16, one on each side frame member, for engaging the ends of a strap 17 that is trained around a load 18 resting on ledge 7 and backed against the forward edge of said side frame members.

The above-described truck follows general design and supports load 18 in the usual manner as the truck is moved along the ground on its wheels.

According to the invention, the jack 8 is securely affixed to the upper portion of frame 5. In this case, the barrel 19 of said jack is welded, strapped or bolted to transverse members 13 substantially centrally between side frame members 11. It will be noted that said jack is of elongated form and that the lower end of barrel 19 is located to be somewhat higher above the ground than is the conventional height of the tail 20 of a vehicle, thereby enabling the platform 10 on the ram to be positioned above said vehicle tail. The length of the barrel 19 is such that ram 9 may be projected to bring platform 10 closely adjacent to the truck wheels 6. A conventional manipulating handle 21 is provided for the jack to effect projection of the ram which, except for its elongated form, and if the same is of the hydraulic type, is provided with the usual fluid bypasses, valves, etc.

Platform 10 extends rearwardly beyond the rear edges of frame members 11 and is preferably provided, at its rearward end with either a wide roller, or with a pair of spaced rollers 22 substantially as shown.

In use, with the ram 9 retracted, the loaded truck is moved against the vehicle tail. This can ordinarily be done from the ground by one man who then gets up on the vehicle tail in a position behind the upper end of the truck. He then reciprocates or otherwise operates handle 21 to cause ram 9 to project downwardly until wheels 22 encounter the top face of the vehicle tail 20. This position is shown by the full lines of Fig. 2. Now, by grasping the upper transverse member 13 or one of the arcuate frame portions 12 with one hand and, with the other, continuing to manipulate jack handle 21, the barrel 19 of the ram is projected upwardly and, since the same is fixed to the truck frame, the latter moves upwardly with its load 18.

The operator may maintain the truck substantially vertical as the same is being elevated, or he may pull back on the upper end of the frame, using rollers 22 as a fulcrum and simultaneously keeping the rear edge of the frame members against the vehicle tail. Finally, when wheels 6 of the truck have been elevated sufficiently to enable them to ride on the vehicle tail, as shown in the dot-dash lines of Fig. 2, the handle 21 may be released so that the operator has both hands available to pull back on the truck which first rides on rollers 22 and then on wheels 6 also. Thus, the operator is enabled to move the loaded truck along the vehicle tail to any desired position, upend the truck to a vertical position, and release strap 17 to free load 18 from the truck. At any time thereafter the ram of the jack may be retracted and the truck is again ready for a new load.

It will be realized, of course, that a truck loaded on the vehicle may be lowered to the ground by reversing the above procedure. The ram is first projected, the loaded truck is wheeled to the edge of the tail 20, and the ram is retracted into the jack barrel effecting lowering of the truck to the ground.

While the invention that has been illustrated and described is now regarded as the preferred embodiment, the construction is, of course, subject to modifications without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. A hand truck comprising a frame having an article-supporting ledge extending forwardly from said frame and support wheels at the lower end of the frame and rearward of said ledge, a vertically disposed jack barrel affixed to said frame and extending above the upper end thereof, the lower end of the barrel being open, a ram extending from the barrel downward through said open end, an actuator connected to the barrel to extend and contract the ram toward and from the truck wheels, and an extension on the end of the ram extending rearwardly with respect to both the frame and the wheels thereof and which rests upon a tail piece of a vehicle to constitute a fixed support relative to which the truck frame may be movable vertically.

2. A hand truck according to claim 1: said frame having transversely spaced side frame members, said extension being disposed between said frame members, and transversely spaced wheels on the rearwardly extending portion of said extension and constituting a traction support for the truck.

References Cited in the file of this patent

UNITED STATES PATENTS

| | | |
|---|---|---|
| 878,546 | Lyon | Feb. 11, 1908 |
| 1,607,851 | Slater | Nov. 23, 1926 |
| 1,654,188 | Phillips | Dec. 27, 1927 |
| 2,415,655 | Reinert | Feb. 11, 1947 |
| 2,514,825 | Zenko | July 11, 1950 |
| 2,598,489 | Bayer et al. | May 27, 1952 |
| 2,608,258 | Jenkins | Aug. 26, 1952 |

FOREIGN PATENTS

| | | |
|---|---|---|
| 102,314 | Great Britain | Nov. 30, 1916 |